United States Patent [19]

Lerche et al.

[11] Patent Number: 4,842,093
[45] Date of Patent: Jun. 27, 1989

[54] VEHICULAR THEFT PREVENTION SYSTEM AND METHOD

[76] Inventors: Nolan C. Lerche, 12114 Dorrance, Stafford, Tex. 77477; Edward A. Fletcher, 13419 Linden; Michael H. Twedell, 2411 N. Ferrisberg, both of Sugarland, Tex. 77478

[21] Appl. No.: 192,223
[22] PCT Filed: Apr. 19, 1988
[86] PCT No.: PCT/US88/01183
§ 371 Date: Apr. 19, 1988
§ 102(e) Date: Apr. 19, 1988
[87] PCT Pub. No.: WO88/08381
PCT Pub. Date: Nov. 3, 1988

[51] Int. Cl.[4] .............................................. B60R 25/00
[52] U.S. Cl. .................................... 180/287; 307/10.3
[58] Field of Search ...................... 180/287; 340/63, 64

[56] References Cited

U.S. PATENT DOCUMENTS

| 3,614,458 | 10/1971 | Stein | 180/287 |
| 4,110,734 | 8/1978 | Lepore et al. | 180/287 |
| 4,150,731 | 4/1979 | Tannenbaum | 180/287 |
| 4,320,382 | 3/1982 | Roucek | 180/287 |
| 4,645,939 | 2/1987 | Robinson | 340/63 |

Primary Examiner—David M. Mitchell
Assistant Examiner—Ross Weaver
Attorney, Agent, or Firm—Darryl M. Springs

[57] ABSTRACT

A system and method for preventing unauthorized starting of a motor vehicle. A timing interval of preselected duration is generated only upon detecting positioning of an ignition switch to a first position by means of a proper key inserted into the vehicle ignition switch. An electrical indication is generated when the ignition switch is positioned to a second position which, in one embodiment, corresponds to a start position of an automobile ignition switch. A starting circuit interrupt element remains in or is urged into a normally closed state to electrically complete the starting circuit only when the electrical indication appears during the time interval. The starting circuit may thereby only be energized for starting the motor during a normal preselected starting sequence comprised of key insertion followed by positioning of the switch from the first to the second state within the preselected time interval.

48 Claims, 5 Drawing Sheets

VEHICULAR THEFT PREVENTION SYSTEM AND METHOD

TECHNICAL FIELD

This invention relates to technology for prevention of vehicle theft, and, more particularly, relates to systems and methods for disabling the starting mechanism of such vehicles having ignition key systems.

BACKGROUND ART

Various techniques have been devised for combatting the serious problem of motor vehicular theft. Such techniques generally are in one of a number of categories. First, devices have been provided which basically are nothing more than supplemental switches in the starting circuit which are hidden on the vehicle from view of the would-be thief and which selectively activate and deactivate the starting circuit.

Second, many forms of motion sensors have further been provided for sensing motion of the parked vehicle caused by tampering and the movement imparted to the vehicle by the thief in an attempt to gain entry and start the vehicle. Other types of apparatus sought to detect unauthorized entry into the vehicle and were often variously coupled not only with apparatus for disarming the starting circuit, but with a wide variety of attention getting or warning devices in the form of sirens, flashing lights or the like which sought to ward off the thief and warn the owner or others nearby of the attempted theft.

Each of these prior techniques suffered from numerous deficiencies, many of which were common to all such devices. One of the most serious drawbacks was that such systems were active rather than passive in the sense that they required the owner to repetitively arm and disarm these devices manually. Not only would the owner from time to time forget to arm or disarm the theft prevention system, but this precluded other authorized individuals from using and protecting the vehicle unless they knew precisely the operating procedure of the protection system. Many of these systems are notoriously unreliable, giving rise, for example, to the familiar situation often witnessed wherein any minor and innocent motion imparted to the vehicle set off a loud and bothersome siren, often in the most inappropriate places.

Moreover, if the thief was sufficiently proficient, notwithstanding the setting off of visual or audible warning devices, the vehicle could nevertheless be started in a sufficiently short time and driven to a location where the warning device may be deactivated so as to effect the theft.

Still further, if the owner was not in proximity of the vehicle to disarm the alarm once it was set off, the disconcerting experience of coming back to a vehicle with a drained battery frequently resulted, often leaving the operator stranded. Moreover, with respect to some of these devices, the effective operation thereof might also drain the battery or render an override impossible so as to preclude starting the vehicle when desired.

Further difficulties with prior attempts to solve the serious and increasing problem of automobile theft are also related to these prior devices. Once a thief discovered how to override the theft prevention system, the vehicle would operate in a normal fashion. It would, however, be highly desirable to provide a system wherein even if the thief is otherwise able to override a protection system to put the vehicle into a position wherein the motor may be cranked, the vehicle will nevertheless simulate an inoperative condition as, for example, simulating the sound of a weakened or dead battery.

Another defect common to most prior art systems relating to their active nature was that they did not seek to simply monitor the normal and correct sequence of events encountered in an authorized starting of the vehicle to determine whether the start circuit should be energized to permit starting. In other words, none of the prior systems sought to simply monitor whether a proper normal sequence had occurred of insertion of a key into the ignition switch, followed within a relatively short and preselected period of time by the positioning of the switch in the start position to thereby energize the starting circuit to start the vehicle.

Other drawbacks of prior systems relate to their expense in terms of the cost of the system and its installation, as well as the complexity of the system and a frequent requirement for supplemental installation of additional wiring, components and the like.

Thus, it may be appreciated that a vehicle theft prevention system and method is highly desired which is of a simple, inexpensive and reliable design which might be readily installed on a number of different vehicles with minimum component installation and wiring. Such a system is further highly desired which is entirely passive, and thus can be employed in repeated sequences of starting and stopping of the vehicle without attendant acts of arming and disarming being required of the operator. Further, the system will in every respect appear to operate in the normal operational sequential steps of starting and stopping the vehicle.

A system is further desired in relation to this latter feature which simply monitors a normal sequence of starting events, the absence of which would signal unauthorized operation of the vehicle. It is also desirable to provide a system and method which, upon attempted theft, would simulate inoperability of the vehicle as, for example, in simulating the sound of a weak or dead battery. A system is further desired which, for the aforementioned redundancy and safety reasons, would require presence of two normally occurring events in order to permit starting of the vehicle, such as insertion of the proper key simultaneously occurring with the closing of the driver's door.

DISCLOSURE OF INVENTION

The hereinbefore described deficiencies of the prior art systems and methods are overcome by the present invention having the desired features described above. Accordingly, a system and method for preventing unauthorized starting of a motor in a vehicle or the like is disclosed which upon detecting an abnormal start sequence allows the starter solenoid current to flow for several milliseconds and subsequently interrupts the solenoid power thereby providing a dead battery sound and guarantees that the auto's engine will not start because engine rotation by the starter has not occurred.

A keyed ignition switch means defines a plurality of electrical states. Detector means monitors, in combination, the simultaneous presence of the proper key within the ignition switch and the positioning of the switch means to a preselected position, whereupon an electrical time interval of preselected duration is triggered. An electrical signal is generated corresponding to positioning of the switch means to a next preselected position which, in one embodiment, corresponds to the starting position of an automobile ignition switch. Comparison is made to determine if this signal occurs within or outside of the preselected time interval, and a control signal is generated in response thereto.

Circuit interrupt means are provided responsive to this control signal for opening a starting circuit when the control signal indicates occurrence of the electrical signal outside of the time interval to prevent starting of the motor. Such means further permits the starting circuit to remain closed and energized when the control signal indicates occurrence of the electrical signal within the time interval, whereby the motor may be started.

In a preferred embodiment, the circuit interrupt means comprises a normally closed electromagnetic relay. Presence of the electrical signal within the time interval generates a control signal whereby the relay remains in the normally closed position to complete the start circuit path from the battery through the ignition switch and relay to the starting solenoid. This corresponds to a normal sequence of events wherein the key is present in the ignition switch followed by rotation of the ignition switch from the RUN to the START position within the preselected time interval, which may be selected to be a nominal 1.5 seconds.

Another aspect of the invention is to detect the rotation of the actual key lock tumbler mechanism by the owner's key. For General Motors vehicles this is accomplished by monitoring the ignition key warning switch contacts which close when the key is inserted and opens whenever the ignition switch is rotated beyond the OFF position. For Ford and other similar steering columns, insertion of the key is detected by monitoring the key buzzer switch closure along with the advancement to the ACCY position. This rotation can only be accomplished by having the correct key. Therefore, whenever a thief breaks the steering column for gaining access to the switch mechanism, the proper switch sequence can not be followed and the theft deterrent system will disable the power to the starter solenoid.

In the preferred embodiment, presence of the electrical signal outside the preselected time interval corresponds to an abnormal sequence of events (such as failure to rotate the ignition switch by a proper key from the RUN to the START position within the time interval, or absence of the time interval due to non-use of the key). This generates a control signal deenergizing the relay to the open position, whereby the start circuit path is opened to prevent starting of the motor. In this condition, due to the delay time (nominally of a few milliseconds) between de-energizing of the relay by the control signal and opening of the relay to the starting circuit, the starting circuit path is momentarily completed. This action permits momentary closure before opening of the relay during the delay time until the relay opens the start circuit. This momentary closure and loss of power simulates the relay "clicking" sound commonly associated with a weak battery in order to discourage attempted theft.

Also in the preferred embodiment, the detector means further senses for the simultaneous presence of one or more closed vehicle doors along with the presence of the proper key within the switch and positioning of the switch means to the preselected position to stimulate generation of the electrical time interval of preselected duration. Accordingly, status of the sensed door being in an open position will inhibit generation of the electrical time interval just as would the absence of the key or failure to position the ignition switch by means of the key to the preselected position. In this manner, because the door is open, the time interval is inhibited and precludes occurrence of the electrical starting signal. This in turn ultimately causes, by means of the aforestated control signal, energization of the circuit interrupt means to prevent starting of the motor when the sensed door is in an open state, thus serving as a safety feature.

Accordingly, it is a principal feature of the present invention to provide an improved theft deterrent system which is totally passive to the operator, being a device which never needs to be armed or disabled, and having an operating sequence used by the operator of merely inserting the key and performing a normal key operated starting sequence.

It is a further primary feature of the present invention to provide a secondary security level which requires the driver's door to be closed before the theft deterrent system will allow the auto to start.

It is still another feature of the present invention to simulate the sound of a dead battery whenever the proper sequence of events are altered and the deterrent system disables the starting mechanism.

Yet another feature the present invention is the provision of an interface with a siren or other visual or audible alarm means which may be armed by the vehicle operator.

Another feature of the present invention is to detect the removal of or damage to the vehicle steering column shroud and in response thereto inhibiting the vehicle's starting mechanism.

BRIEF DESCRIPTION OF DRAWINGS

In order that the manner in which the above-recited advantages and features of the invention are attained can be understood in detail, a more particular description of the invention may be had by reference to specific embodiments thereof which are illustrated in the accompanying drawings, which drawings form a part of this specification.

In the drawings.

BEST MODE OF CARRYING OUT THE INVENTION

Figure 1:
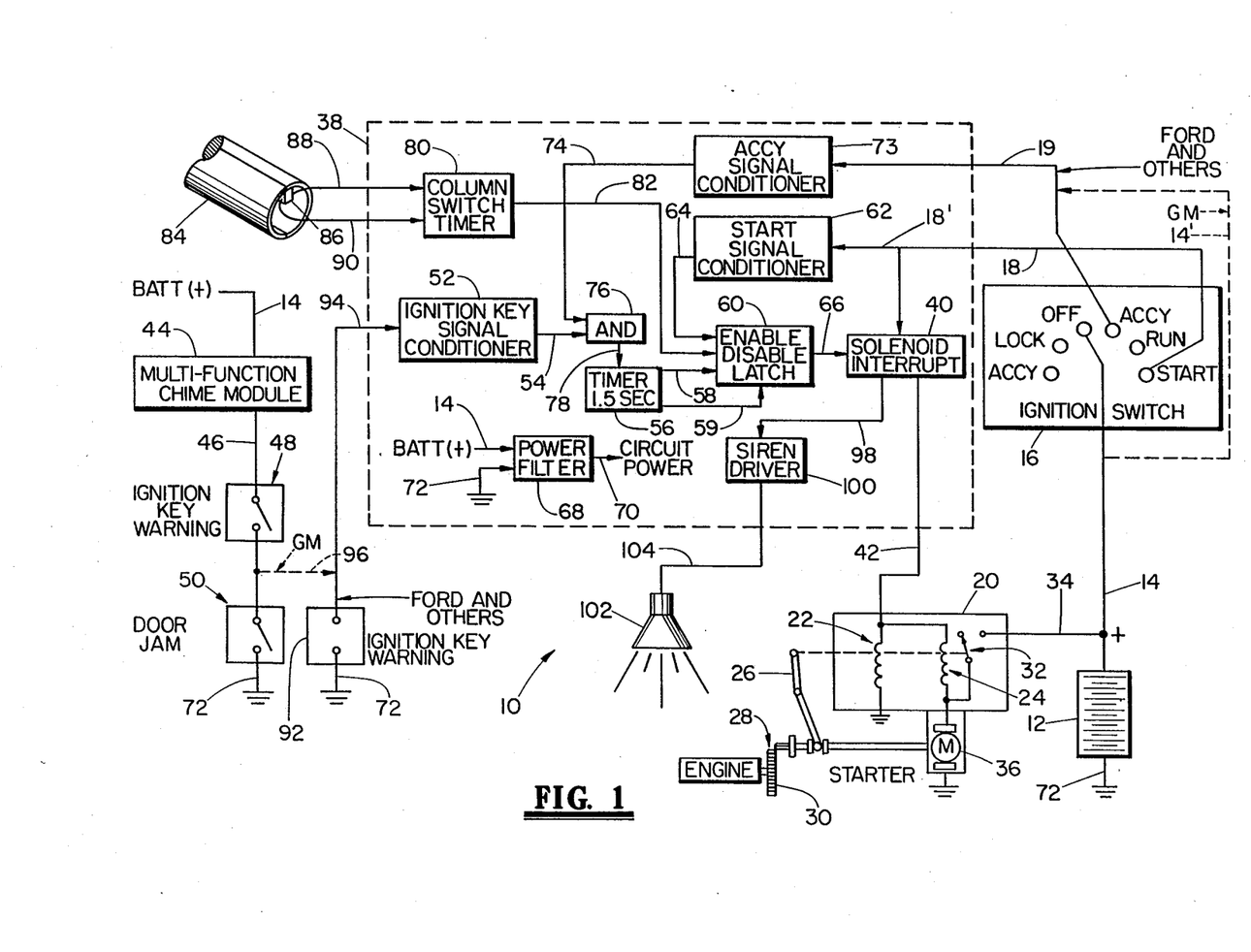
FIG. 1 is a schematic block diagram of the theft prevention system and method of the present invention illustrating interconnection of various components thereof to components commonly encountered in vehicles for which the invention is intended.

Referring first to FIG. 1, the vehicular theft prevention system 10 may be seen depicted therein generally in block diagram form. A battery 12 includes a ground connection 72 and a positive lead 14 which delivers 12 vdc power to a conventional multi-position ignition switch 16, as well as to a multi-function chime module 44 (General Motors vehicles) and a power filter circuit 68 of the circuit module 38. A conductor 18 interconnects the switch 16 START position contact to a solenoid interrupt circuit 40 of the circuit module 38. The interrupt circuit 40, in turn, is connected by conductor 42 which is connected to a conventional vehicle starter solenoid 20. The solenoid 20 will include first and second electromagnetic relays 22 and 24. When the relay 22 is energized, it will cause mechanical linkage 26 to urge starter motor gear 28 into rotating engagement with the engine flywheel 30. In like manner, energization of the relay 24 will close the starter contacts 32 to complete a circuit from the battery 12 through conductor 34, relay contacts 32 to the starter motor 36 and ground in order to crank the starter and cause rotation of the starter gear 28.

It will be recognized that the various components relating to the solenoid 20, linkage 26, gears 28 and 30 and starter motor 36 are all part of a conventional vehicle engine starting system well known in the art. In this manner, without the other components of the present invention to be hereinafter described with respect to the circuit module 38 and the like, the conductor 18 from the ignition switch 16 would normally be interconnected to lead 42 directly to the solenoid 20 for conventional operation of the starter system of the vehicle.

Accordingly, upon rotational manipulation of the key in the ignition switch 16 to the START position, the starting circuit path is thereby completed from the battery 12 through conductor 14 and through ignition switch 16, and through conductors 18 and 42 to the solenoid 20 and thence to ground. When the engine is craked sufficiently to start, the operator will release the key to move to the RUN position thus disengaging the starter motor. Alternatively, in some systems the motor starting will be sensed to cause the mechanical linkage 26 to disengage the starting gear 28 from the flywheel 30. This linkage is interconnected to the contact 32 whereby upon disengagement of the starting gear 28, the contact 32 is opened thus opening the circuit from the battery 12 through the conductor 34 and contacts 32 and starter motor 36 to ground and de-energizing the starting motor 36.

With reference to the theft prevention circuit module 38, inasmuch as it is electrically interconnected in series with the lead 18 from the ignition switch 16 and the lead 42 interconnected to the starter solenoid 20, it may be appreciated that opening and closing of the solenoid interrupt circuit 40 thereby opens and closes the electrical path between leads 18 and 42 for controlling the activation and de-activation of the conventional vehicular engine starting circuitry just described with respect to the solenoid 20, linkage 26, and the like. Thus, in broad terms, by providing a control signal to the interrupt circuit 40 in accordance with parameters sensed in a desired manner by the present invention, the automatic activation or deactivation of the starting circuitry of the vehicle may thereby be controlled. As an added security feature, the siren driver circuit 100 provides a control signal via conductor 104 to the siren alarm 102. The siren alarm 102 is inhibited when the solenoid interrupt circuit 40 is closed and enables the alarm 102 whenever the solenoid interrupt circuit 40 is open.

With the foregoing in mind, the general description will now be given of the generation of this control signal to cause interruption and completion of the circuit path between leads 18 and 42 and siren driver circuit 100 for controlling the operation of siren 102 by means of the module 38 in accordance with teachings of the invention. The steering column shroud 84 is diagrammatically shown including a column shroud switch 86 which senses the normal closed condition or state of the steering column shroud 84. The shroud switch 86 is interconnected to the input of the column switch timer circuit 80 of module 38 by conductors 88 and 90. The ignition switch 16 has an ACCY switch position interconnected by conductor 19 to the input of an ACCY signal conditioner circuit 73 of module 38. In the configuration shown, when the key is inserted into the ignition switch 16 and rotated to the ACCY position, an electrical signal is applied from battery 12 through conductor 14, switch 16 and conductor 19 to the circuit 73. In operation, Ford Motor Company (Ford) vehicles and other like vehicles have key ignition switches 16 that operate as hereinabove described. However, in General Motors (GM) vehicles, the +12 vdc electrical power from battery 12 is applied directly via conductors 14 and 14' (in dotted lines) and conductor 19 as a direct input to the signal conditioning circuit 73.

The input signal to the ignition key signal processor circuit 52 is delivered by an interconnected conductor 94, which in the case of Ford and other vehicle manufacturers, is derived by insertion of the key into the ignition switch 16 which also closes the ignition key warning switch 92 and connects conductor 94 to ground potential. In the case of GM vehicles, a multifunction chime module 44 is provided having circuitry powered by electrical energy delivered through the lead 14 from the battery 12. This chime module 44 is series connected to the ignition key warning switch 48, door jam switch 50 and then to ground potential at 72. The warning switch 48 is preferably a single pole, single throw (SPST) normally open (n.o.) switch which closes upon insertion of the appropriate key into the ignition switch 16. Similarly, the door jam switch 50 is an SPST n.o. switch which is opened upon closing of the door with which it is associated, which is normally the driver's door, and, conversely, the switch 50 is closed when the door is left open. It may be a matter of choice as to whether to provide only one door jam switch for the driver's door or, alternatively, any number of additional door jam switches wired in series and associated with other doors of the vehicle, or to eliminate the door jam switches entirely.

It will be recalled from the foregoing that upon insertion of the key into the ignition switch, the signal applied through lead 46 becomes a positive d.c. level. Presence of the key within the ignition switch 16 and rotational positioning thereof to the RUN position will open the switch 48. Similarly, closing of the door associated with the door jam switch 50 will open switch 50. Thus, when the appropriate key is inserted in the ignition switch 16 and the switch rotated to the RUN position, and if the doors are closed thus opening the door switch 50, a series conductive path will be created and a positive signal applied through conductors 96 and 94 to circuit 52. However, if the door is open, switch 50 is closed thus shorting the signal appearing on conductor 96 to ground through the ignition key warning switch 48 and door jam switch or switches 50 (when present). It will be appreciated that inasmuch as the switch 48 senses presence of the key in the ignition causing a positive d.c. level signal on conductor 96, this level will also diminish to a low level upon removal of the key from the ignition switch.

Referring back to FIG. 1, the previously described key signal appearing on conductor 94 will preferably be delivered to the module 38 and, more particularly, to the ignition key signal conditioner circuit 52. The basic purpose of circuit 52 is to provide impedance matching and level conversion between the signal appearing on conductor 94 and a timer circuit 56. It will be noted in passing that the module 38 includes appropriate power filtering circuitry 68 well known in the art. Power is delivered by lead 14 from the battery 12 to the circuit 68 which is thence delivered as d.c. power out through lead 70 to the various components of the module 38, including the ignition key signal conditioner 52, timer 56, enable/disable latch 60, solenoid interrupt circuit 40, the column switch timer 80, the START switch signal conditioner circuit 62 and the ACCY signal conditioner circuit 73.

The output of the ACCY signal conditioner circuit 73 is applied via conductor 74 as one input to an AND gate circuit 76. The other input to the AND gate 76 is the electrical signal received from the ignition key signal conditioner circuit 52 through lead 54. When both input signals are present, the AND gate 76 applies an output signal through conductor 78 to the timer circuit 56. The timer circuit generates a timing signal of preselected duration (1.5 seconds) which is applied as inputs to the enable/disable latch circuit 60 through conductor 58. Reset signals from timer 56 are applied through lead 59 to the enable/disable latch circuit 60. The START signal conditioner circuit 62 applies the conditioned START position signal as another input to the enable/disable latch circuit 60 via lead 64. In addition, the normally closed column shroud switch 86 applies an electrical signal to the column switch timer 80 as hereinabove described. The output of the column switch timer 80 is interconnected as another input to the enable/disable latch circuit 60 by conductor 82. The enable/disable latch circuit 60 applies an "enable" or "disable" signal to the solenoid interrupt circuit 40 in order to control the operation of the vehicle starter solenoid 20 as hereinabove described.

Figure 2:
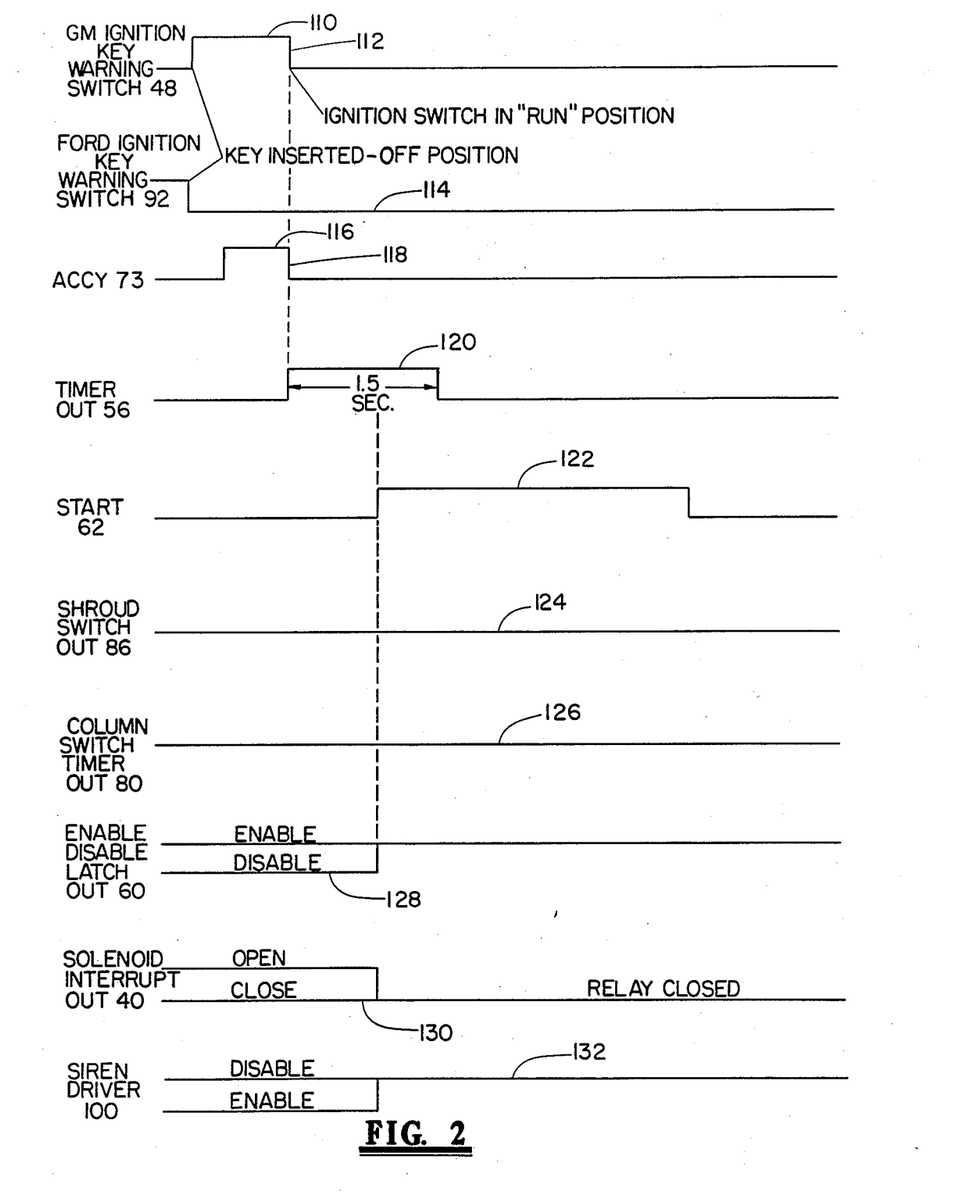
FIG. 2 is a timing diagram illustrating the temporal relationship between various signals and component operations of the apparatus of FIG. 1 during a normal sequence of events in starting the vehicle.
Figure 3:
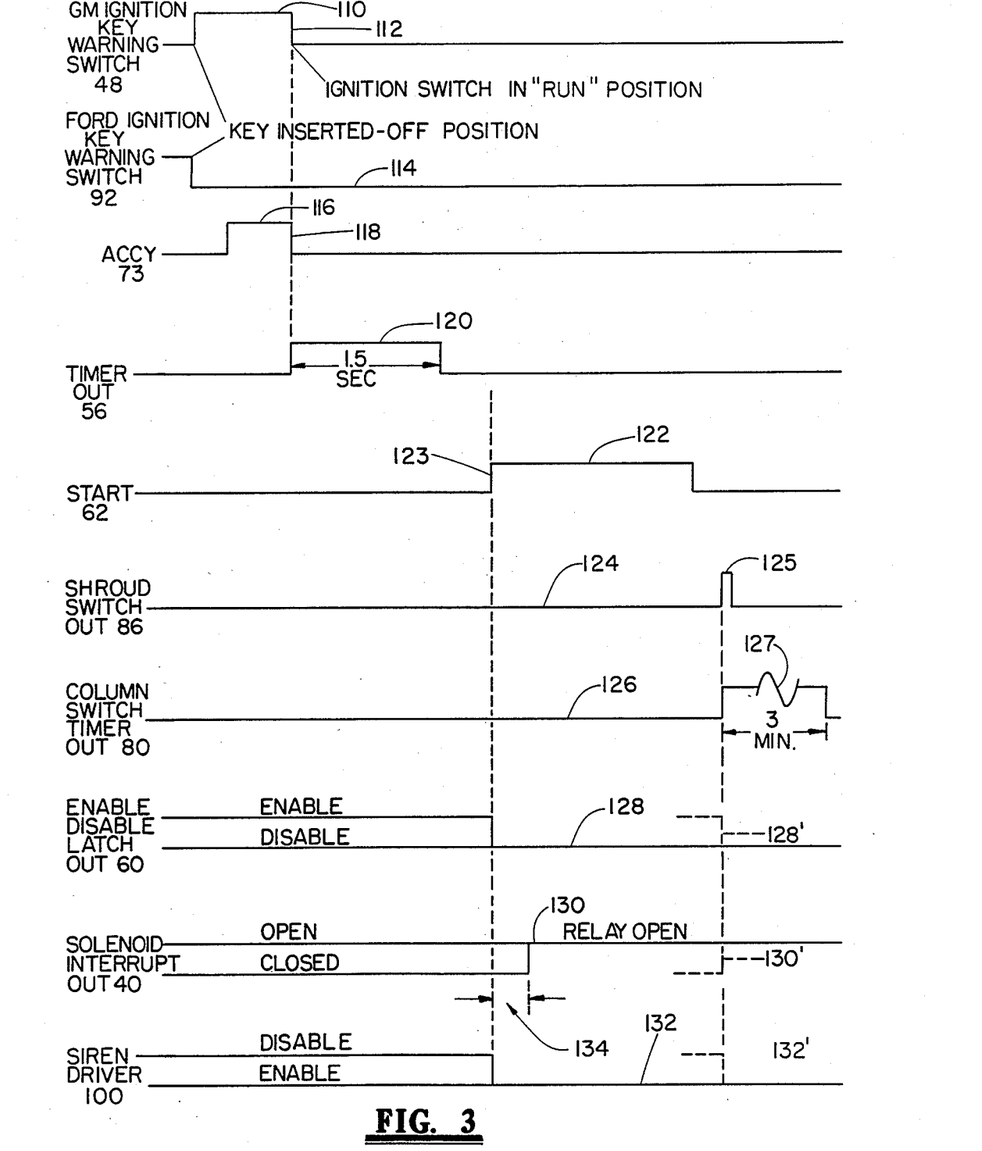
FIG. 3 is another timing diagram illustrating the temporal relationship between various signals and component operations of the apparatus of FIG. 1 during an abnormal sequence of events in starting the vehicle, wherein the present invention precludes starting of the vehicle.

Referring now to FIGS. 1-3, detailed descriptions of the normal vehicle starting sequence and an unauthorized or abnormal vehicle starting sequence will be explained. Since the ignition operation varies for different makes of automobiles, one description of operation will address the starting sequence for GM made vehicles, and another description will address the starting sequence for Ford and other makes of automobiles. FIG. 2 is a signal timing diagram for a normal vehicle starting sequence which permits the vehicle to be started. FIG. 3 is a signal timing diagram for an "abnormal" or unauthorized vehicle starting sequence (attempted theft) which disables the starter solenoid of the vehicle.

The operating sequence for GM type ignitions will be explained first. External connections for the module 38 are such that the input to the ignition key signal conditioner 52 is connected to the GM ignition key warning switch 48 by leads 96 and 94. In addition, the ACCY signal from the ignition switch 16 is not used and the ACCY signal conditioner circuit 73 input is connected to BATT(+) 14. For the GM vehicle, a multifunction chime module 44 is series connected to the ignition key warning switch 48, door jam switch 50, and finally to ground 72. The output of the multi-function chime module 44 supplies a positive dc voltage through switch 48 and conductors 96 and 94 to the ignition key signal conditioner circuit 52, when the ignition key warning switch 48 is closed and the door jam switch 50 is open. The door jam switch 50 is designed to provide that the switch will be open whenever the door is closed and the switch will be closed whenever the door is open. When a key is inserted into the ignition switch, the ignition key warning switch 48 is closed and again opens when the ignition key is rotated from the OFF position to the RUN position. It can therefore be seen that if the door is open, the output of the ignition key warning switch 48 will be routed to ground 72 through the door jam switch 50. Therefore, the door must be closed in order for the ignition signal conditioner 52 to process the signal from the multi-function chime module 44.

With conditions set as described above, operation of the module 38 will be described. With the drivers door closed, the operator of the vehicle will insert the key into the ignition switch causing a positive dc signal level to be routed to the ignition key signal conditioner 52. When the operator manipulates the ignition key to the RUN position, the ignition key warning switch 48 opens and removes the signal. The result of this action generates a pulse 110 as shown in FIG. 2. The AND circuit 76 receives the ignition key signal conditioner 52 output signal via lead 54 and routes its output through lead 78 to the 1.5 sec timer 56. The falling edge 112 of signal 110 starts the timer 56. The timer output signal 120 is shown in FIG. 2. Only during this 1.5 second time period will the enable/disable latch 60 accept the start signal 122 from the conditioner circuit 62. The output signal of the START signal conditioner circuit 62 is applied to the enable/disable latch circuit 60 through conductor 64.

Accordingly, the vehicle operator has a maximum time of 1.5 seconds to rotate the ignition switch from the RUN position to the START position in order that the enable/disable latch 60 will enable the solenoid interrupt circuit 40 thus connecting the battery power via lead 14 to the starter solenoid 20. The enable/disable latch signal 128 is shown in FIG. 2. The solenoid interrupt relay contact condition (closed) is shown in FIG. 2 as signal level 130. The solenoid interrupt circuit 40 also generates a signal applied to the siren driver circuit 100 through conductor 98. The siren driver 100 output signal is shown in FIG. 2 and identified as signal 132. The polarity of the siren drive signal 132 is such that whenever the solenoid interrupt 40 is conducting, the siren alarm 102 will be disabled and not allowed to sound. It can therefore be seen that with the passive action of getting into a vehicle, closing the door, inserting the key into the ignition, and rotating the ignition switch in a normal fashion (from the OFF through the START position) the vehicle is allowed to start. No abnormal time delays are necessary.

Conversely, from the foregoing it will be appreciated that if a thief seeks to override the system by bypassing the above sequence, the predetermined time signal 120 will not be generated by the timer 56 (inasmuch as the interval is triggered by detection of the presence of the key and positioning of the ignition switch in the proper order as shown in timing diagrams of FIG. 2). If the time signal 120 is not generated, then it is impossible for the START signal via leads 18 and 18' to occur within the time interval window. The enable/disable latch 60 functions in such a manner that if the START signal 122 is initiated outside of the timer signal 120 1.5 second window, the enable/disable latch 60 will signal the solenoid interrupt circuit 40 to open, thereby disabling the application of electrical power through lead 18 to the starter solenoid input 20. The solenoid interrupt circuit 40 will in turn signal the siren driver 100 to allow the siren alarm 102 to be activated. This sequence of events may now be seen with more detailed reference to FIG. 3. FIG. 3 is a timing diagram illustrating the previously described "abnormal" sequence of events caused by absence of a key within the ignition switch 16 or failure to position the ignition switch from the RUN position to the START position within the prescribed and predetermined time interval.

However, inspection of the START signal 122 in FIG. 3 in comparison to that of FIG. 2 reveals that the leading positive going edge 123 has occurred outside the time interval of the timer signal 120, thereby indicating rotation of the ignition switch 16 from the RUN to the START position in a longer time period than permitted by the preselected time interval. The presence of the START signal 122 may also not be coincident with the 1.5 second timer signal 120. For this reason, the enable/disable latch 60 will detect such non-coincidence of the timer signal 120 and the leading edge 123 of the START signal 122 and generate a disable control signal 128 indicating this non-coincidence. As shown by the enable/disable latch signal 128, and the status of the solenoid interrupt relay contacts as shown at 130, the solenoid interrupt circuit 40 does not conduct the battery power via leads 14, 18 and 42, thereby opening the relay 32 and disabling the vehicle starter motor 36. The solenoid interrupt 40 will in turn signal the siren driver 100 to generate an enable signal 132 to activate the siren alarm 102.

A close inspection of FIG. 3 reveals that, notwithstanding the time of occurrence of the leading edge 123 of the signal 122, the actual time at which the relay within the solenoid interrupt circuit opens will be delayed for some short time interval within the normal response time of conventional electromagnetic relays, which may be on the order of a few milliseconds or the like. This momentary time delay 134 (if the solenoid interrupt circuit relay was in the closed state when the disabling latch signal is received) is shown in FIG. 3, where the solenoid interrupt relay status is shown going from a "closed" to an "open" state following the initiation of the latch signal 128. This delay 134 in de-energizing the relay of the interrupt circuit 40 may be appreciated as having a beneficial effect, namely the maintaining of a closed circuit path between leads 18 and 42 for a momentary period of time which, in turn permits passage of current therethrough for very short period of time. This action permits passage of current through the leads 18 and 42 and solenoid interrupt circuit 40 to the starter motor 36 for a momentary time period sufficient to start energizing the starter motor 36 coil but not long enough to actually turn over the starter. This action will simulates the sound associated with an attempt to start an engine with a weak battery. Thus, when an unauthorized individual seeks to start the vehicle by hot wiring without a key, or by positioning the ignition switch in the START position after the preselected time interval has expired or without a key being inserted, the vehicle will create a starter motor sound similar to the action of a weak or dead battery and will not start, thereby discouraging the individual from further attempts at starting.

As an added security feature, the module 38 monitors the steering column shroud switch 86 which disconnects whenever the column shroud 84 is either broken or separated. Shroud housings are typically built in two pieces so that they can be installed around the steering wheel column. The column switch timer 80, upon detecting an open column switch signal 125, produces an output signal 127 which positively sets the enable/disable latch 60 in the disabled state. FIG. 3 indicates the occurrence of the column switch signal 124–125, the column switch timer output signal 126–127. The occurrence of the column switch timer signal applied via lead 82 to the enable/disable latch 60 will force the latch to a disabled state and its output is shown in dotted lines at 128' in FIG. 3. Simultaneously, the solenoid interrupt circuit opens the power relay as shown at 130', and the siren driver circuit output steps to the enable level as shown at 132' to turn on the siren or other alarm 102.

The column switch timer 80 will remain disabled as long as the column shroud switch 86 is open. In order to allow the vehicle to be started by an authorized person, the column switch timer 80 will step to an enable condition after a preselected time interval (typically 3 minutes) following the closure of the column shroud switch 86. Disposition of the column switch timer output signal 126 is shown in FIG. 3. Following the 3 minute closure of the column switch 86, the column switch timer 80 allows the enable/disable latch 60 to function normally to again enable the solenoid interrupt circuit 40.

The following description of the operation of the starting sequence will address the starting ignition sequence of Ford and other manufacturers of vehicles. In this case, the ignition signal input through conductor 94 to the ignition key signal conditioner circuit 52 will be connected directly through the key warning switch 92 to ground 72. The ACCY signal conditioner circuit 73 input through conductor 19 will be connected to the ACCY switch position of the ignition switch 16. The ignition key warning switch 92 provides a ground 72 upon insertion of the ignition key into the ignition switch and the signal is shown at 114 in FIG. 2. This ignition key warning switch 92 remains closed as long as the key is inserted, unlike the GM ignition key switch 48, which closes upon insertion of the ignition key and opens when the ignition switch 16 advances to the RUN position.

Therefore, in order to generate a positive pulse to trigger the timer 56, the ACCY signal is processed by the ACCY signal conditioner circuit 73 and provides a signal 116 to the timer when the ignition switch 16 is manipulated from the OFF position through the ACCY position to the RUN position. The AND circuit 76 will produce a change in output corresponding to the ACCY signal conditioner circuit 73 output only when both the ignition key signal conditioner circuit 52 output is positive "and" the ACCY signal conditioner 73 produces a positive pulse. The trailing edge 118 of the ACCY pulse 116 will trigger the start of the 1.5 second timing signal 120 as shown in FIG. 2. Therefore the key must be inserted and the ignition switch rotated from the OFF position through the ACCY position in order to generate a pulse output of the AND gate 76 to trigger the timer 56. In all other respects, other than the ignition key starting sequence, the auto-theft circuit module 38 for Ford and other makes of vehicles operates in the identical manner as that above described for GM made vehicles, both in the normal starting sequence and in the "abnormal" or unauthorized starting sequence.

Figure 4A:
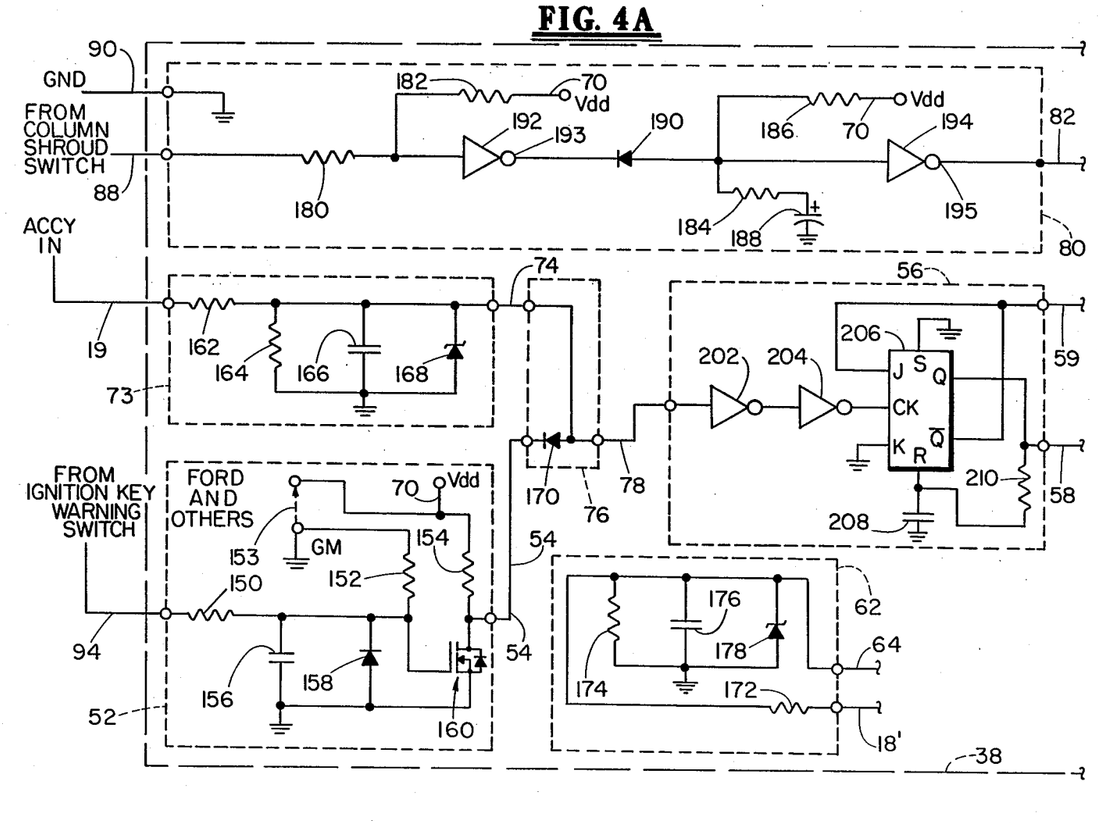
FIGS. 4a and 4b are detailed schematic diagrams illustrating the various components and circuits used to implement the functional blocks in the block diagram of the present invention depicted in FIG. 1.
Figure 4B:
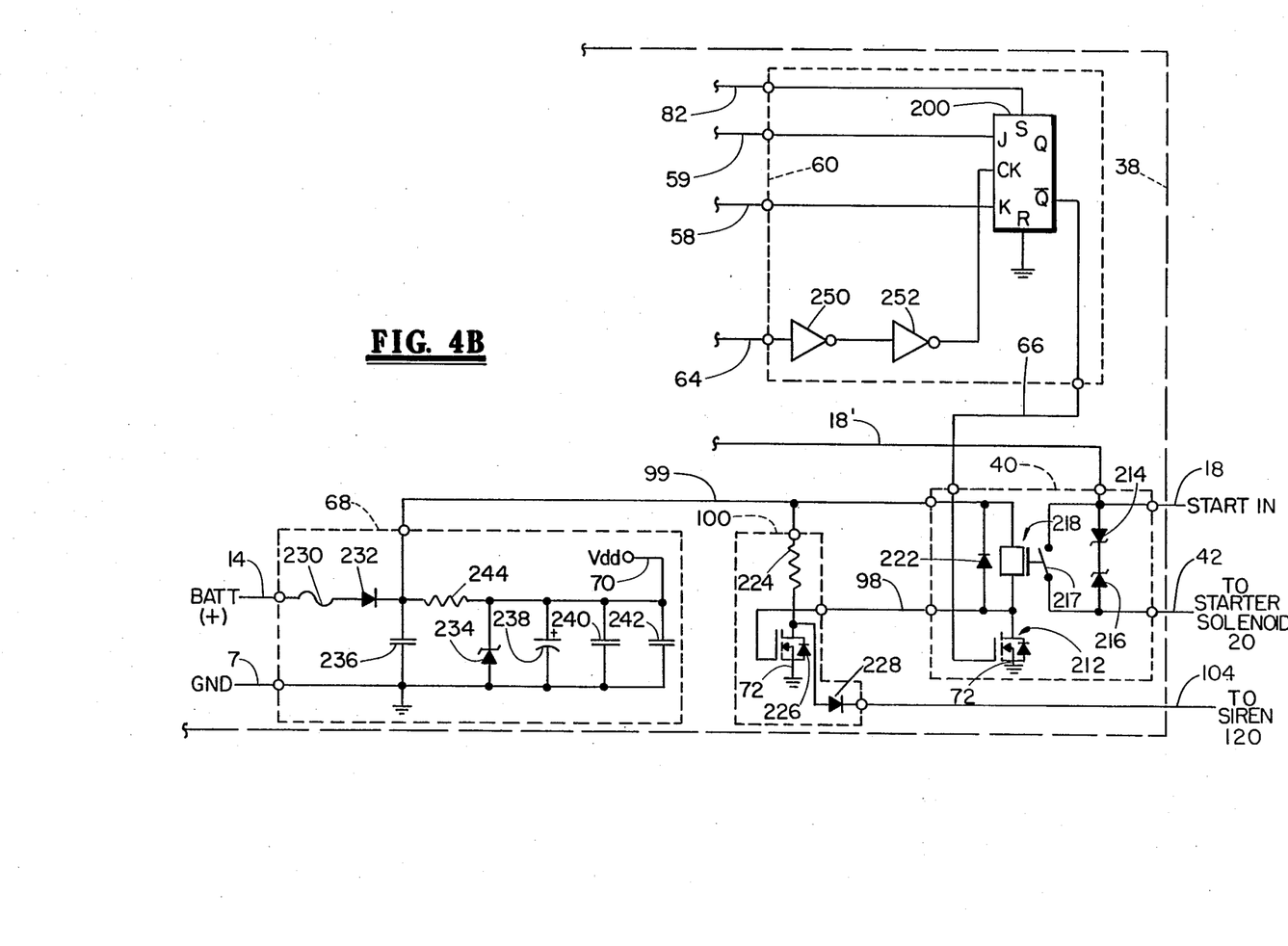

FIG. 4 is a detailed schematic diagram of the vehicular theft prevention circuit module 38, and inputs/outputs and designated circuits all correspond to the reference numbers shown in the block diagram of FIG. 1. The ACCY signal conditioner circuit 73 receives the ACCY signal input through lead 19. The circuit 73 is implemented by resistors 162 and 164, capacitor 166 and a Zener diode 168. The resistors 162, 64 and capacitor 166 provide a low pass filter for the ACCY signal input. The Zener diode 168 acts to clip transient voltages above 15 vdc.

The ignition key signal conditioner circuit 52 receives the ignition key warning signal from either switch 48 or 92 through input lead 94 where the signal is applied to a low pass noise filter comprising resistors 150, 152 and capacitor 156. The Zener diode 158 clips voltage transients above 15 vdc. The input signal is applied to an N-channel FET 160 to provide impedance matching for the ignition key warning switch and level conversion for driving the Schmitt inverters 202 and 204 of the enable/disable latch circuit 60 as will be hereinafter further described. Resistor 154 is a pull-up resistor in the FET circuit. Resistor 152 is connected directly to ground potential when a GM made vehicle is interfaced, and if the vehicle is a Ford or other make, resistor 152 is connected directly to Vdd (70) and the ground connection is removed.

The AND circuit 76 is a diode "and" function provided by the diode 170. The logic of the "and" function dictates that the ACCY signal conditioner circuit 73 output applied to the AND gate circuit through conductor 74 must be a "high" logic level before the ignition key signal conditioner circuit 52 output applied via conductor 54 can be gated to the input of the timer circuit 56. Accordingly, both the ACCY signal at lead 19 and the ignition key signal input at lead 94 to the ignition key signal conditioner circuit 52 must be at a "high" logic level before the timer 56 can be gated on by the AND gate 76.

The START signal conditioner circuit 62 comprises a low pass noise filter including resistors 172, 174 and capacitor 176. The Zener diode 178 functions to clip transient voltages above 15 vdc. The START signal from the ignition switch 16 is applied to the START signal conditioner circuit 62 via conductor 18', and the signal output of circuit 62 is applied through lead 64 as an input to the enable/disable latch circuit 60 as will be herewith described in greater detail.

The column switch timer circuit 80 receives a pair of input leads 88 and 90 from the steering column shroud switch 86 mounted on the shroud 84. The timer circuit 80 includes an input biasing resistor network comprising resistors 180 and 182 for the integrated circuit inverter 192. When the circuit 38 is powered "on", or the column switch 86 changes from an open condition to a closed condition, a "low" logic level is applied as an input to the inverter 192. The inverter 192 inverts the electrical signal received through input lead 88 such that the output of the inverter 192 at 193 goes to a "high" logic level which reverse biases the diode 190. With diode 190 reverse biased, the capacitor 188 is allowed to charge through resistors 184 and 186 having a source of electrical power at Vdd 70. When the input to the second inverter 194 reaches ½ Vdd, the output 195 of inverter 194 goes to a "low" logic level and applies the "low" logic signal out through conductor 82 as one input to the enable/disable latch circuit 60 for purposes to be hereinafter more particularly described. The charge time for the capacitor 188 to reach ½ Vdd is approximately three (3) minutes. If the column shroud switch 86 is opened as a result of a broken or separated column shroud 84, the output at 193 of inverter 192 goes to a "low" logic level thus forward biasing the diode 190. When diode 190 is forward biased, the capacitor 188 rapidly discharges through the resistor 184 driving the output of inverter 194 at 195 to a "high" logic level which is applied as hereinabove described as an input to the enable/disable latch circuit 60.

The timer circuit 56 (1.5 second) includes a pair of series connected integrated circuit Schmitt inverters 202 and 204 receiving the AND gate signal through conductor 78, an integrated circuit JK flip-flip 206 and a timing resistor 210 and a timing capacitor 208. The Schmitt inverters 202 and 204 are required to generate a fast clock pulse input to trigger the JK flip-flop 206, and to provide hysteresis for preventing double triggering of the JK flip-flop 206. The normal or static condition of the timer circuit 56 is for the flip-flop "Q" output to be at a "low" logic level, and the timing capacitor 208 to be at zero volts or discharged. When the timer 56 input signal received via lead 78 goes to a "high" logic level, the flip-flip 206 output steps "high" and remains "high" until the timing capacitor 208 charges through timing resistor 210 to a level of approximately ½ Vdd. The "Q" output of flip-flop 206 remains at a "high" logic level for approximately 1.5 seconds, thus forming the timing pulse 120 (see FIGS. 2 & 3). Simultaneously, the reset ("R") input of flip-flop 206 (interconnected through resistor 210 and capacitor 208) resets the flip-flop, and the "Q" output goes to a "low" logic level which is applied as an input to the enable/disable latch circuit 60 through lead 59. Then the capacitor 208 discharges back to 0 vdc through resistor 210. At this time the timer circuit 56 is again in the normal or static condition ready for another timing cycle.

The enable/disable latch circuit 60 comprises a pair of series connected Schmitt inverters 250 and 252 and a single JK flip-flop 200. The set ("S") input of the flip-flop 200 is interconnected to the output lead 82 from the column shroud switch timer 80 as previously described. The purpose of the latch 60 is to test the timing relationship between the output of the timer 56 at lead 58 and the START signal conditioner circuit 62 output through lead 64. The START signal 122 received via conductor 64 is applied to the series connected Schmitt inverters 250 and 252 which are required in order to generate a fast clock pulse input to trigger the JK flip-flop 200, and to provide hysteresis for preventing double triggering of the flip-flop.

Upon power-up the "$\overline{Q}$" / output of flip-flop 200 could be at either a "high" or "low" logic level. The "enable" function output to the solenoid interrupt circuit 40 is applied out via lead 66 and occurs when the "$\overline{Q}$" / output is at a "high" logic level. Conversely, the "disable" function occurs when the "$\overline{Q}$" / output of flip-flop 200 is at a "low" logic level. If the leading edge 123 of the START signal 122 (see FIG. 2) received from the START signal conditioner circuit 62 and applied to the "CK" input of flip-flop 200 occurs during the presence of the 1.5 second timer signal 120 (see FIG.

2), the "Q̄" / output of flip-flop 200 goes to a "high"-'logic level, thus "enabling" the latch 60. If the leading edge of the START signal 122 occurs during the absence of the timer signal 120 (see FIG. 3), the "Q̄" / output of flip-flop 200 goes to a "low" logic level, and the latch 60 is "disabled". As hereinabove described, if the steering column switch 86 (see FIG. 1) is open, the "low" logic level applied as an output through conductor 82 to the set "S" input of flip-flop 200 will unconditionally set the flip-flop 200 to the "disabled"state and forcing the "Q̄" /output to a "low" logic level. If the contacts 217 of relay 218 are in the closed state due to the last latch output level of the flip-flop 200, then if a START signal is received b the flip-flop 200 from the START signal conditioner 62, and the flip-flop 200 "Q̄" / output goes low to send a disabling ignition control signal to relay 218, the inherent delay in the opening of the relay contacts 217 (previously closed) will be the discrete time delay shown at 134 in FIG. 3. During this momentary time period (delay) vehicle electrical power will be applied to the starter motor 36. However, the time period will be long enough to start energizing the starter motor coil and to hear an audible starter motor "sound" but not long enough to actually turn over the starter motor. Accordingly, this "audible" starter motor sound will simulate the weak or dead battery sound as previously described.

The solenoid interrupt circuit 40 includes an N-channel FET 212, diodes 214 and 216, and a relay 218. The purpose of the solenoid interrupt circuit is to interrupt the high current path (conductors 14, 18 and 42) between the ignition switch 16 and the starter solenoid 20. The FET 212 receives the "enable/disable" output of latch circuit 60 through lead 66 and powers the coil of relay 218, including the voltage limiting diode 222. The normally open (n.o.) contacts 217 of relay 218 close to complete the high current path between the input lead 18 from the ignition switch 16 and the output lead 42 to the starter solenoid 20. Accordingly, the relay 218 must be energized in order to enable the starter solenoid 20. This need for positive energizing of relay 218 is another security feature. The diodes 214 and 216, disposed across the relay contacts 217, provide for arc suppression of the high current path through the relay contacts which would otherwise limit the life of the relay contacts.

The siren driver circuit 100 comprises a resistor 224, an N-channel FET 226 and a diode 228. When the relay 218 is energized, the FET 226 is rendered non-conducting and a positive voltage signal 132 (see FIG. 2) is applied to the diode 228, forward biasing the diode, and applying the signal as a positive output signal to the siren 102 (see FIG. 1) through lead 104. This positive signal disables the siren alarm 102. When the relay 218 is not energized, the FET 226 is conducting and reverse biases the diode 228. Reverse biasing of the diode 228 inhibits the sending of a positive electrical signal to siren 102, thereby enabling the siren alarm 102 as shown as signal 132 (see FIG. 3).

The power filter circuit 68 includes a fuse 230, resistor 244, diode 232 and Zener diode 234, and capacitors 236, 238, 240 and 242. This filtering circuit conditions the raw battery power received through lead 14 from battery 12. The fuse 230 protects the vehicle power system in case of an internal short within the circuit module 38. Diode 232 protects the module 38 in the event the battery power is inadvertently connected in reverse polarity. Resistor 244 acts as a current limiting resistor for the Zener diode voltage regulator 234. Capacitors 236, 240 and 242 function as a high frequency filter. Capacitor 238 is an electrolytic capacitor that acts as a low frequency filter. The power filter circuit output is clamped to +15 vdc by the regulating Zener diode 234. The output lead 70 provides regulated and filtered dc electrical power (Vdd) to the module 38.

The following table lists the components identified in the schematic of FIG. 4:

TABLE 1

| Component Specifications | |
|---|---|
| Reference No. | Specifications |
| 150, 172, 180 & 162 | Resistor: 20k |
| 164, 174 & 182 | Resistor: 100k ohms |
| 186 & 210 | Resistor: 887k ohms |
| 152 | Resistor: 330k ohms |
| 244 | Resistor: 100 ohms |
| 154 & 184 | Resistor: 10k ohms |
| 224 | Resistor: 300 ohms |
| 156, 166, 176, 236, 240 & 242 | Capacitor: 0. mf |
| 208 | Capacitor: 2.2 mf |
| 238 | Capacitor: 100 mf |
| 188 | Capacitor: 68 mf |
| 158, 168, 178, 214, 216 & 234 | Zener diode: IN4744 |
| 170, 190, 222, 228 & 232 | Diode: IN4007 |
| 160, 212 & 226 | N-Channel FET: 2N7000 |
| 192, 194, 202, 204, 250 & 242 | Schmitt inverters: 40106 |
| 200 & 206 | JK Flip-Flop: 4027 |
| 218 | Power Relay: 12 vdc, 30 amp contacts |
| 230 | Fuse: 1 amp |

Several beneficial features of the present invention may now be appreciated. First, it will be noted that a system has been provided wherein there is no need for the operator to activate or deactivate the theft prevention system inasmuch as it operates by monitoring for a normal sequence of events to be expected to occur during an authorized start before the system will enable a start. Typically the invention is best suited to an application wherein a vehicle is equipped with an ignition switch in the steering column surrounded by a shift bowl and steering column shroud. A normal starting sequence would comprise insertion of the proper key into the switch followed by its rotation from the OFF position to the RUN position and thence to the START position within a pre-selected time interval, this sequence being detected by the invention. An abnormal sequence might bypass the initial detection of the presence of the key inasmuch as a thief typically will seek to break through the shift bowl and column shroud to gain access to the ignition switch whereupon he may attempt to hot wire it as required. Thus in the present system, there is no need to manually activate or deactivate a switch or the system because sensors simply monitor for this normal sequence or an abnormal sequence.

Secondly, a safety feature has been provided, if desired, wherein not only must the key be present but one or more selected doors in GM vehicles (typically the door adjacent the driver) must be detected in a closed state before the engine start will be possible. Also, an additional beneficial feature is that should an abnormal starting sequence be detected (whether by nonuse of a key, or failure to set the ignition switch to the start position within the prescribed time), the engine will simulate the sound of a severely weakened battery, thus suggesting to a thief that further attempts are futile. In addition, an optional alarm siren may be activated.

It is therefore apparent that the present invention is one well adapted to obtain all of the advantages and features hereinabove set forth, together with other advantages which will become apparent from a description of the apparatus itself. It will be understood that certain combinations and subcombinations are of utility and may be employed without reference to other features and sub-combinations. Moreover, the foregoing disclosure and description of the invention is only illustrative and explanatory thereof, and the invention admits of various changes in the size, shape, and material composition of its components, as well as in the details of the illustrated construction without departing from the scope and spirit thereof.

We claim:

1. A method of controlling a vehicle engine starter solenoid to prevent unauthorized starting thereof wherein the vehicle utilizes a key and a key ignition switch, comprising the steps of:

detecting the presence of the key in the ignition switch in a first preselected switch position and in response thereto generating a first electrical signal,
   generating a second electrical signal in response to key manipulation of the vehicle ignition switch to a second preselected switch position,
   detecting the occurrence of said first and second electrical signals and in response thereto generating a third electrical signal having a preselected time period,
   generating a fourth electrical signal in response to key manipulation of the vehicle ignition switch to the START position,
   comparing the initiation of said forth electrical signal to the time interval of said third electrical signal and generating an ignition control signal in response thereto, and
   controlling the application of electrical power to the vehicle engine starter solenoid in response to said ignition control signal,
   wherein during said comparing step if the initiation of said forth signal occurs during said third electrical signal time period said ignition control signal is an enabling control signal for permitting energization of the vehicle engine starter solenoid and starting of the vehicle engine, and
   wherein during said comparing step if the initiation of said fourth signal occurs outside of the time period of said third electrical signal said ignition control signal is a disabling control signal for blocking energization of the vehicle engine starter solenoid and prohibiting starting of the vehicle engine.

2. The method as described in claim 1, wherein said step of generating a first electrical signal comprises the steps of:

detecting the insertion of the key in the ignition switch, and
   initiating generation of an electrical signal having a first preselected voltage level in response to detection of the key in the ignition switch.

3. The method as described in claim 2, wherein said step of generatng a second electrical signal comprises the additional step of initiating generation of an electrical signal having a second preselected voltage level in response to key manipulation of the ignition switch to said second preselected switch position.

4. The method as described in claim 3, wherein said second preselected ignition switch position is the ACCY position as the ignition switch is rotated toward the START position.

5. The method as described in claim 3, wherein said step of generating a second electrical signal comprises the step of changing the voltage level of said first electrical signal to a second preselected voltage level in response to said key manipulation of the ignition switch to said second preseleted switch position.

6. The method as described in claim 5, wherein said second preselected ignition switch position is the RUN position as the ignition switch is rotated toward the START position.

7. The method as described in claim 1, further including the additional steps of:

monitoring the closing of a selected vehicle door, and
   inhibiting the generation of at least said first electrical signal in response to the failure to close said selected vehicle door.

8. The method as described in claim 1, further including the additional steps of:

monitoring the status of the steering column shroud in the vehicle,
   generating a shroud electrical control signal in response to detecting damage to the steering column shroud, and
   inhibiting the generation of said ignition electrical control signal in response to generation of said shroud electrical control signal.

9. The method as described in claim 1, further including the step of initiating a vehicle alarm in response to generating a disabling ignition electrical control signal.

10. The method as described in claim 1, further including the step of producing audible sounds in simulation of a weak vehicle battery in response to generating a disabling ignition control signal.

11. The method as described in claim 8, wherein said shroud electrical control signal has a preselected time period for inhibiting generation of said ignition electrical control signal during said time period.

12. A system for controlling a vehicle engine starter solenoid to prevent unauthorized starting thereof wherein the vehicle utilizes a key and a key ignition switch, comprising:

switch means actuated by the presence of the key in the ignition switch in a first preselected switch position and in response thereto generating a first electrical signal,
   the vehicle ignition switch generating a second electrical signal in response to key manipulation of the ignition switch to a second preselected switch position,
   detecting means for detecting the occurrence of said first and second electrical signals and in response thereto generating a third electrical signal having a preselected time period,
   the vehicle ignition switch further generating a fourth electrical signal in response to key manipulation of the vehicle ignition switch to the START position,
   comparing means for comparing the initiation of said fourth electrical signal to the time interval of said third electrical signal and generating an ignition control signal in response thereto, and
   controller means for controlling the application of electrical power to the vehicle engine starter solenoid in response to receipt of said ignition control signal, wherein if the initiation of said fourth signal occurs during said third electrical signal time period said comparing means generates an enabling ignition control signal for application to said controller means and permitting energization of the vehicle engine starter solenoid and starting of the vehicle engine, and wherein if the initiation of said fourth signal occurs outside of the time period of said third electrical signal said comparing means generates a disabling ignition control signal for application to said controller means and blocking energization of the vehicle engine starter solenoid and prohibiting starting of the vehicle engine.

13. The system as described in claim 12, wherein said switch means for generating said first electrical signal comprises:
switch means for detecting the insertion of the key in the ignition switch, and
the vehicle ignition switch initiating generation of an electrical signal having a first preselected voltage level in response to detection of the key in the ignition switch.

14. The system as described in claim 13, wherein said second electrical signal is generated by the ignition switch initiating generation of an electrical signal having a second preselected voltage level in response to key manipulation of the ignition switch to said second preselected switch position.

15. The system as described in claim 14, wherein said second preselected ignition switch position is the ACCY position as the ignition switch is rotated toward the START position.

16. The system as described in claim 14, wherein said second electrical signal comprises changing the voltage level of said first electrical signal to a second preselected voltage level in response to said key manipulation of the ignition switch to said second preselected switch position.

17. The system as described in claim 16, wherein said second preselected ignition switch position is the RUN position as the ignition switch is rotated toward the START position.

18. The system as described in claim 13, wherein said switch means for detecting the insertion of the key in the ignition switch is the vehicle key warning switch.

19. The system as described in claim 18, further comprising door monitoring means for monitoring the closing of a selected vehicle door and inhibiting the generation of at least said first electrical signal in response to the failure to close said selected vehicle door.

20. The system as described in claim 19, wherein said door monitoring means comprises a vehicle door jam switch connected in series with said vehicle ignition key warning switch and ground potential for grounding the circuit through said switches for preventing generation of said first electrical signal.

21. The system as described in claim 12, further comprising column signal means for monitoring the status of the steering column shroud in the vehicle and generating a shroud electrical control signal in response to detecting damage to the steering column shroud and applying said control signal to said comparing means for inhibiting the generation of said ignition electrical control signal.

22. The system as described in claim 21, wherein said column signal means comprises:

a steering column shroud switch connected across said steering column shroud and generating a shroud electrical signal in response to damage to said shroud, and shroud signal timing means receiving said shroud electrical signal from said shroud switch and in response thereto generating a shroud electrical control signal having a preselected time period for inhibiting the generation of said ignition electrical control signal during said time period.

23. The system as described in claim 12, further comprising:
an alarm, and
circuit means for energizing said alarm in response to the generation of a disabling ignition electrical control signal.

24. The system as described in claim 12, wherein said controller means comprises relay means responsive to said ignition electrical control signal, wherein when said enabling ignition electrical control signal is received said relay means is energized for closing relay contacts therein and completing the electrical circuit to said starter solenoid, and wherein said disabling ignition electrical control signal is received said relay means is de-energized for opening relay contacts therein and breaking the electrical circuit to said starter solenoid.

25. The system as described in claim 24, wherein said relay means includes a power relay having a delay characteristic that delays opening of the relay contacts for a momentary time interval after said relay means receives said disabling ignition control signal.

26. The system as described in claim 25, wherein said power relay includes an electromagnetic coil which is responsive to said ignition control signal and wherein if the contacts of said relay are in the closed state when said fourth electrical signal is generated, then upon receipt of a disabling ignition electrical control signal the inherent momentary delay in said relay being de-energized and said relay contacts opening will permit momentary application of the vehicle electrical power to the vehicle starter and simulate the sound of a weak vehicle battery.

27. The system as described in claim 26, wherein said momentary time interval is of a magnitude sufficient to begin energization of the starter coil but not long enough to actually turn over the vehicle starter.

28. The system as described in claim 12, wherein said detecting means comprises an AND gate circuit receiving as inputs said first and second electrical signals and whose output in response thereto is said third electrical control signal.

29. The system as described in claim 28, wherein said comparing means includes a latch circuit means receiving as inputs said third and fourth electrical signals, and if said fourth electrical signal is received during said third electrical signal time interval generating an enabling ignition control signal, and if said fourth electrical signal is received without said third electrical signal time interval generating a disabling ignition control signal.

30. The system as described in claim 29, wherein said latch circuit means includes a JK flip-flop receiving said third electrical signal at its "K" input port and receiving said fourth electrical signal at its "K" input port.

31. In a vehicle theft protection system for mounting in a vehicle utilizing a key and key ignition switch and having a source of electrical power, a starter solenoid for starting the vehicle engine, a steering column shroud switch that generates a shroud electrical signal in response to said column shroud, an ignition key warning switch for detecting the presence of the key in the ignition switch and generating a first electrical signal in response thereto, and wherein said key ignition switch may be manipulated to a plurality of switch positions for generating a second electrical signal in response to manipulation of the ignition switch to a preselected switch position and further generating a start electrical signal in response to manipulating the ignition switch to the starting switch position, the control circuit improvement comprising     detecting means for detecting the occurrence of the first and second electrical signals and in response thereto generating a third electrical signal having a preselected time period,     comparing means for comparing the initiation of the start electrical signal to the time interval of said third electrical signal and generating an ignition control signal in response thereto, and     controller means for controlling the application of electrical power to the vehicle engine starter solenoid in response to receipt of said ignition control signal,     wherein if the initiation of the starter signal occurs during said third electrical signal time period said comparing means generates an enabling ignition control signal for application to said controller means permitting energization of the vehicle engine starter solenoid and starting of the vehicle engine, and     wherein if the initiation of the start signal occurs outside of the time period of said third electrical signal said comparing means generates a disabling ignition control signal for application to said controller means for blocking energization of the vehicle engine starter solenoid and prohibiting starting of the vehicle engine.

32. The control circuit as described in claim 31, wherein the first electrical signal is generated in response to the vehicle ignition switch initiating generation of an electrical signal having a first preselected voltage level in response to detection of the key in the ignition switch.

33. The control circuit as described in claim 31, wherein said second electrical signal is generated by the ignition switch initiating generation of an electrical signal having a second preselected voltage level in response to key manipulation of the ignition switch to said second preselected switch position.

34. The control circuit as described in claim 33, wherein said second preselected ignition switch position is the ACCY position as the ignition switch is rotated toward the START position.

35. The control circuit as described in claim 33, wherein said second electrical signal comprises changing the voltage level of said first electrical signal to a second preselected voltage level in response to said key manipulation of the ignition switch to said second preselected switch position.

36. The control circuit as described in claim 35, wherein said second preselected ignition switch position is the RUN position as the ignition switch is rotated toward the START position.

37. The control circuit as described in claim 31, further comprising door monitoring means for monitoring the closing of a selected vehicle door and inhibiting the generation of at least said first electrical signal in response to the failure to close said selected vehicle door.

38. The control circuit as described in claim 37, wherein said door monitoring means comprises a vehicle door jam switch connected in series with said vehicle ignition key warning switch and ground potential for grounding the circuit through said switches for preventing generation of said first electrical signal.

39. The control circuit as described in claim 31, further comprising column signal means for monitoring the status of the steering column shroud in the vehicle and generating a shroud electrical control signal in response to detecting damage to the steering column shroud and applying said control signal to said comparing means for inhibiting the generation of said ignition electrical control signal.

40. The control circuit as described in claim 39, wherein said column signal means comprises:

a steering column shroud switch connected across said steering column shroud and generating a shroud electrical signal in response to damage to said shroud, and     shroud signal timing means receiving said shroud electrical signal from said shroud switch and in response thereto generating a shroud electrical control signal having a preselected time period for inhibiting the generation of said ignition electrical control signal during said time period.

41. The control circuit as described in claim 31, further comprising:

an alarm, and circuit means for energizing said alarm in response to the generation of a disabling ignition electrical control signal.

42. The control circuit as described in claim 31, wherein said controller means comprises relay means responsive to said ignition electrical control signal, wherein when said enabling ignition electrical control signal is received said relay means is energized for closing relay contacts therein and completing the electrical circuit to said starter solenoid, and wherein said disabling ignition electrical control signal is received said relay means is de-energized for opening relay contacts therein and breaking the electrical circuit to said starter solenoid.

43. The control circuit as described in claim 42, wherein said relay means includes a power relay having a delay characteristic that delays opening of the relay contacts for a momentary time interval after said relay means receives said disabling ignition control signal.

44. The control circuit as described in claim 43, wherein said power relay includes an electromagnetic coil which is responsive to said ignition control signal and wherein if the contacts of said relay are in the closed state when said start electrical signal is generated, then upon receipt of a disabling ignition electrical control signal the inherent momentary delay in said relay being de-energized and said relay contacts opening will permit momentary application of the vehicle electrical power to the vehicle starter and simulate the sound of a weak vehicle battery.

45. The control circuit as described in claim 44, wherein said momentary time interval is of a magnitude sufficient to begin energization of the starter coil but not long enough to actually turn over the vehicle starter.

46. The control circuit as described in claim 31, wherein said detecting means comprises an AND gate circuit receiving as inputs said first and second electrical signals and whose output in response thereto is said third electrical control signal.

47. The control circuit as described in claim 46, wherein said comparing means includes a latch circuit means receiving as inputs said third and start electrical signals, and if said start electrical signal is received during said third electrical signal time interval generating an enabling ignition control signal, and if said start electrical signal is received without said third electrical signal time interval generating a disabling ignition control signal.

48. The control circuit as described in claim 46, wherein said latch circuit means includes a JK flip-flop receiving said third electrical signal at its "K" input port and receiving said start electrical signal at its "K" input port.

* * * * *